United States Patent [19]
Miloslavsky

[11] Patent Number: 5,963,632
[45] Date of Patent: Oct. 5, 1999

[54] AGENT-INITIATED DYNAMIC REQUEING OF MISROUTED CALLS IN CALL-ROUTING SYSTEMS

[75] Inventor: Alec Miloslavsky, San Carlos, Calif.

[73] Assignee: Genesys Telecommunications Laboratories, Inc., San Francisco, Calif.

[21] Appl. No.: 08/797,419

[22] Filed: Feb. 10, 1997

[51] Int. Cl.[6] .............................. H04M 7/00; H04M 3/00
[52] U.S. Cl. ............................................ 379/219; 379/265
[58] Field of Search ..................... 379/265, 266, 379/309, 201, 207, 211, 212, 215, 219, 220

[56] References Cited

U.S. PATENT DOCUMENTS

| | | | |
|---|---|---|---|
| 5,020,095 | 5/1991 | Morganstein et al. | 379/266 |
| 5,249,223 | 9/1993 | Vanacore | 379/266 |
| 5,253,288 | 10/1993 | Frey et al. | 379/265 |
| 5,299,259 | 3/1994 | Otto | 379/266 |
| 5,335,269 | 8/1994 | Steinlicht | 379/266 |
| 5,524,147 | 6/1996 | Bean | 379/265 |
| 5,592,542 | 1/1997 | Honda et al. | 379/266 |
| 5,740,238 | 4/1998 | Flockhart et al. | 379/265 |
| 5,742,675 | 4/1998 | Kilander et al. | 379/265 |

*Primary Examiner*—Krista Zele
*Assistant Examiner*—Benny Q. Tieu
*Attorney, Agent, or Firm*—Donald R. Boys

[57] ABSTRACT

Apparatus and methods are provided for re-routing mis-routed calls in call-routing systems and call-in centers wherein provision is made for commands to be sent from an agent receiving a mis-routed call to a routing intelligence over a digital network connection, causing a mis-routed call to be inserted in a queue of calls to be routed ahead of calls received to be routed after the first call was mis-routed. In some embodiments the first agent may simply send back the mis-routed call to be requeued. In other instances the agent may confer with a second agent at a station to which the call is to be forwarded, before the caller is connected to the second agent. In still other instances the first agent, the second agent, and the caller may be conferenced together.

4 Claims, 5 Drawing Sheets

5,963,632

AGENT-INITIATED DYNAMIC REQUEING OF MISROUTED CALLS IN CALL-ROUTING SYSTEMS

FIELD OF THE INVENTION

The present invention is in the area of telephone call processing and switching, and pertains more particularly to intelligent call-routing systems.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general.. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of such as large insurance organizations. In some cases organizations develop and maintain their own telephony operations with purchased or leased equipment, and in many other cases, companies are outsourcing such operations to firms that specialize in such services.

A large technical support operation serves as an example in this specification of the kind of applications of telephone equipment and functions to which the present invention pertains and applies. Consider such a system having a country-wide matrix of call-in centers, which is more and more a relatively common practice to provide redundancy and decentralization, which are often considered desirable in such operations. Also in such large organizations, business firms have a national, and in many cases a world-wide customer base. Such a system handles a large volume of calls from people seeking technical information on installation of certain computer-oriented equipment, and the calls are handled by a finite number of trained operators distributed over the decentralized matrix of call-in centers.

A problem in operating such a call-in system is in identifying caller requirements and routing individual calls based on the requirements to operators possessing the requisite skills and information to efficiently serve the callers. In most such systems there are a number of sorting criteria to consider. There may be, for example, several products for which technical support is provided. Calls from persons seeking technical aid for a specific product need to be routed to those operators that are trained in support for the specific product. Moreover, there may be such as language requirements as well. In some parts of the country there may be a need for Spanish-speaking operators to serve those customers who speak Spanish rather than English, or who may be more comfortable in Spanish. Sorting and routing calls in this instance is often termed skill-based routing in the art.

Another desirable goal in such a system is to provide efficient and effective service to the largest number of customers with limited operator resources. To accomplish this end it is necessary to seek to route calls with the most up-to-date information concerning operator availability possible, so callers may be cued in the most efficient manner, avoiding long waiting periods for service. It is desirable, that is, to route calls in a manner that minimizes wait time for the customer. This is not only advantageous for the customer, but also to the organization providing the service, as more may then be done with less resources.

Conventionally routing of calls is done statistically, such as by tracking percentages of call load or by some Management Information System (MIS). In these systems data that is at least several minutes old is typically used for call-routing purposes, and, in the few minutes between real-time and data age, load distribution can shift significantly, leading to very inefficient routing. Moreover the data is not always of the sort that could be used for most-efficient routing. Load distribution, for example, does not tell the routing intelligence where there may be an operator with the requisite skills to handle an incoming or waiting call, who is also free of other calls at the moment.

What is clearly needed is a better system and methods to do call routing in real time or very near real time, so delays are kept to a minimum and the best use of available resources may be made.

SUMMARY OF THE INVENTION

In a preferred embodiment of the present invention a telephone call-routing system adapted for routing an incoming call from a caller to individual agents at individual ones of remote telephone stations is provided, comprising a first telephony switch adapted for receiving and forwarding the incoming call to individual ones of the remote telephone stations; and a processor system coupled to the first telephony switch and coupled to the remote telephone stations by a digital network link. The processor system is adapted to control queuing and routing of incoming calls, and to respond to signals received over the digital network link to re-route the call previously routed to a first agent at a first one of the remote telephone stations by inserting the previously routed call into a queue with priority ahead of calls incoming after the first call was originally routed.

The digital network can be of several sorts, but is preferably a TCP/IP link. In some embodiments the processor system is further adapted to re-route the returned call in response to signals received over the digital network link by causing the first agent at the first one of the remote telephone stations to be connected to a second agent at a second one of the remote telephone stations prior to the caller being connected to the second agent. In other embodiments the processor system is further adapted in response to signals received over the digital network link to conference the first agent at the first one of the remote telephone stations with a second agent at a second one of the remote telephone stations together with the caller.

In another embodiment of the invention a call-in center is provided comprising a telephony switch having telephony lines adapted for receiving calls and serving a plurality of telephone workstations to which it may route calls received; and a telephony server connected by a high speed digital link to the telephony switch and having a digital network connection to remote digital devices. In this embodiment the telephony server is adapted to respond to first signals provided by a first agent at a first one of the telephone workstations to send second signals over the digital network connection commanding one of the remote digital devices to reroute a call first routed to the first one of the telephone workstations. In this embodiment the second signals comprise commands to the remote device to requeue the call first routed with priority.

In some embodiments second signals comprise commands to the remote digital device to reroute the call first routed to a second agent at a second call-in center, allowing the first agent to confer with the second agent before the caller is connected to the second agent, and in other embodiments the second signals comprise commands to the remote digital device to reroute the first call routed to a second agent at a second call-in center, conferencing the first agent, the second agent, and the caller.

In yet another embodiment a call-in center is provided comprising a telephony switch having telephony lines adapted for receiving calls and serving a plurality of telephone workstations to which it may route calls received; and a telephony server connected by a high speed digital link to the telephony switch. In this embodiment the telephony server is adapted to respond to first signals provided by a first agent at a first one of the telephone workstations to reroute a call first routed to the first one of the telephone workstations to a second agent at a second one of the telephone workstations connected to the same telephony switch. In the rerouted call the first agent may be connected to the second agent before the caller is connected to the second agent, or the first agent, the second agent, and the caller may be conferenced.

Methods for practicing the present invention are provided below as well as unique connections and adaptations for apparatus. In various embodiments of the invention significant improvements are made over conventional systems for rerouting calls, such that efficiency and use of resources are enhanced.

BRIEF DESCRIPTION OF THE DRAWING FIGURES

DESCRIPTION OF THE PREFERRED EMBODIMENTS

Figure 1:
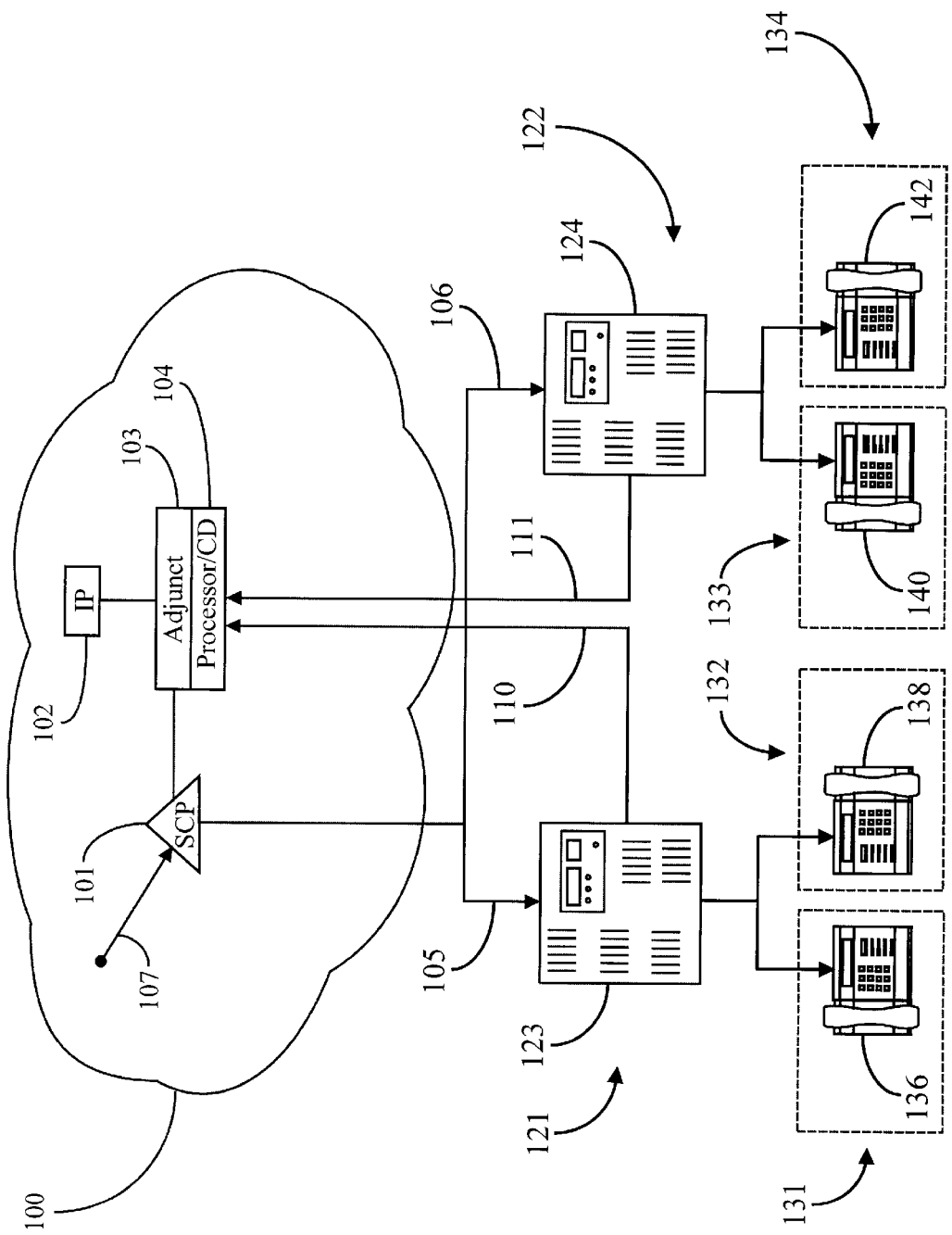
FIG. 1 is a system diagram of a call-routing system in the prior art.

FIG. 1 is a system diagram of a call-routing system in the prior art comprising two call-in centers 121 and 122. These call-in centers comprise equipment sometimes known in the art as Customer Premises Equipment (CPE). Each of call-in centers 121 and 122 includes a computerized call receiving and switching system (123 for center 121 and 124 for center 122) providing routing to individual telephone stations. There may be many more than two call-in centers in many embodiments, but two centers is considered sufficient to illustrate the art and embodiments of the invention.

Each call-in center 121 and 122 included in this example includes at least two telephone-equipped workstations, which in nearly all instances are computer stations having (not shown in FIG. 1) a computer workstation with a video display which may be connected to other networked server equipment holding the service organization's relevant database. For example, the computer device manufacturer in this example may have a connected database including the names, addresses, and other information relating to customers who have registered their purchases with the company, and also the resource information for operators to access in helping callers with their problems.

Workstations 131 and 132 connect to call center 121 in FIG. 1, and include telephones 136 and 138, and workstations stations 133 and 134 connect to call center 122, and include telephones 140 and 142. There may similarly be many more than two workstations in each call center, but two will suffice to describe the art and embodiments of the present invention.

In the descriptions and the drawings each telephone connected in a call-in center is a part of a workstation for a trained operator in the examples herein. The trained operators may be considered to each have a unique set of skills, resources and knowledge, such as, but not limited to, language capability, access to technical information, and specific training.

Calls are routed to call-in centers 121 and 122 over conventional telephony lines 105 and 106 respectively from remote origination points (a customer seeking technical aid has placed a call, for example, to an advertised or otherwise provided 1-800 number). Cloud 100 represents the telephone network system, and is referred to herein as a network cloud. This may be, for example purposes, a regional portion of the world-wide network, or may represent the entire world-wide network of connected telephone equipment. All calls routed to call-in centers 121 and 122 originate somewhere in network cloud 100.

In this example an incoming call to be routed to a call-in center is represented by vector 107 into a Service Control Point (SCP) 101. SCP 101 is telephone switching equipment typically local to the calling party, and is coupled to an adjunct processor 103 which is in turn coupled to a call-distribution processor 104. Call distribution processor 104 has access in this conventional system to call statistics describing call distribution between call-in centers 121 and 122 (typically over a larger number of call-in centers than two), delivered periodically over lines 110 and 111. Lines 110 and 111 represent one-way routing of statistical information and data which in reality is shared with all local systems where and as needed. In this conventional example an intelligent peripheral 102 is also provided to accomplish initial customer contact.

Calls from customers (vector 107) are initially processed with the aid of adjunct processor 103, call distribution processor 104, and intelligent peripheral 102. Statistical call loading data is updated to call distribution processor 104 typically on an average at five to ten minute intervals. As an example of initial processing, a caller may be asked for such as a language preference and for the product and type of information sought. This information is solicited and entered by intelligent peripheral 102. Other sorting is done by adjunct processor 103 based on information provided by distribution processor 104.

After initial processing the incoming call is routed to either call-in center 121 or 122 based upon distribution statistics. Information elicited in initial processing such as language and product category is sent along with the call as DTMF or caller-ID type information. At the call-in center the call is routed to a specific waiting loop based on such information as language and product, and the call then waits until the operator at the particular workstation (131, 132, 133, 134) finishes previous calls and becomes available for the instant call. Here is the source of the enormous irritation and frustration experienced by both calling parties and operators in conventional systems.

It will be apparent to those with skill in the art that SCP 101, adjunct processor 104, distribution processor 104, and intelligent peripheral 102 may be software implementations in computerized equipment, and not necessarily separate hardware entities.

In this example of conventional equipment and processing, little real-time or near real-time variable information is available for call-routing purposes, and some callers may face long delays while others are served relatively quickly. The allocation and management of resources is poor and unbalanced.

Figure 2:
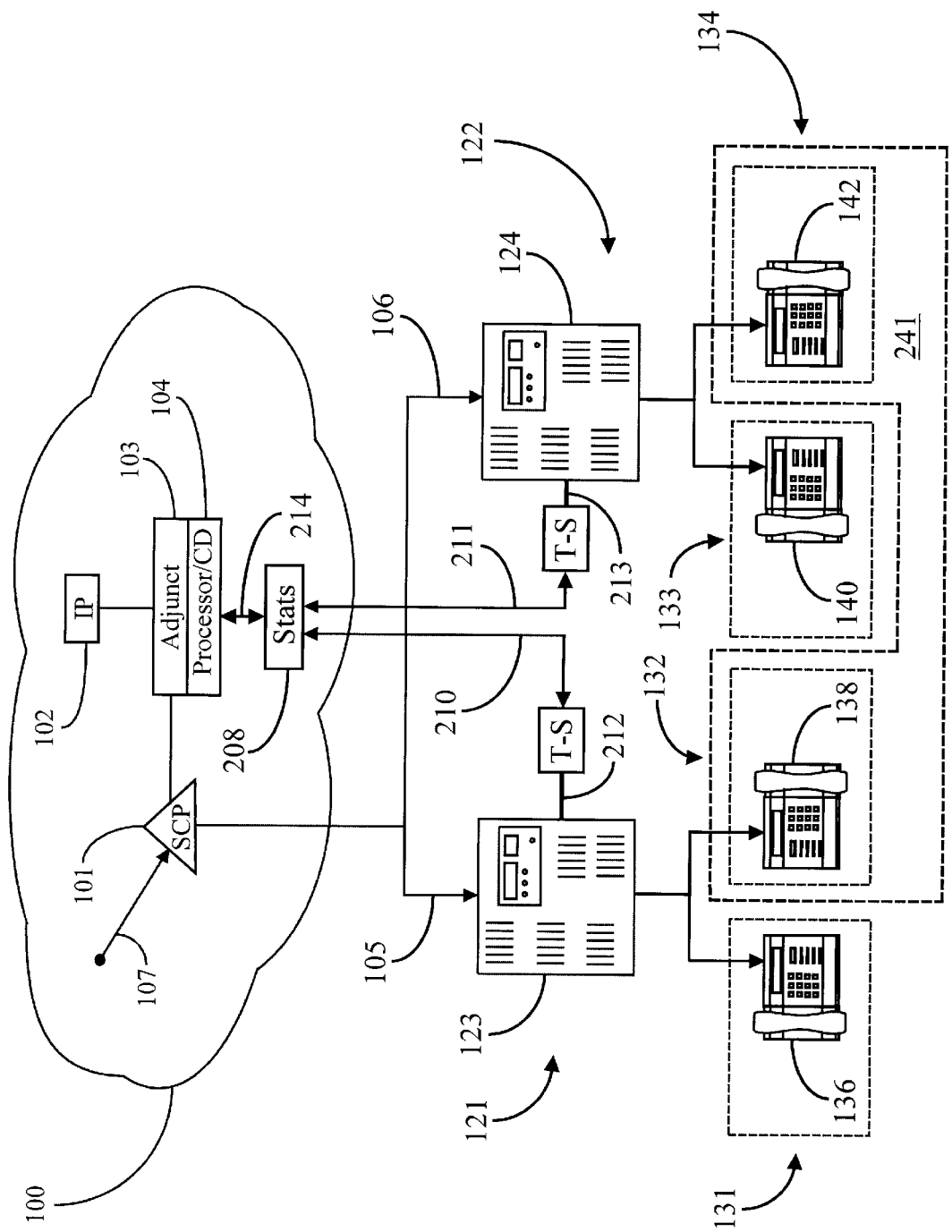
FIG. 2 is a diagram of a call-routing system according to a preferred embodiment of the present invention.

FIG. 2 is a diagram of a call-routing system according to a preferred embodiment of the present invention. At the call origination end a statistical processor 208 is added, communicating with distribution processor 104 by link 214. At each of the call-in centers a telephony server (T-S) is connected to the associated switching system. At call-in center 121, T-S 223 is connected by data link 212, and at call-in center 122 T-S 224 is connected by data link 213. T-S 223 is coupled to statistical processor 208 by a TCP/IP link 210 and T-S 224 is coupled to statistical processor 208 by TCP/IP link 211. T-S 223 and T-S 224 are full-service computer servers having code routines for command communication with the connected switching equipment as well as remote statistical processor 208 (and with many other remote statistical processors).

It will be apparent to those with skill in the art that the TCP/IP nature of communication on lines 210 and 211 is a matter of convenience, providing near real-time updating of information. TCP/IP is a collection of data protocols which are not discussed in detail here, as these protocols are in use and very well-known in the art. There are other protocols that might be used, new protocols may be developed to provide better and faster communication, and other methods may be used to speed up communication. For example, Urgent Dispatch Protocol (UDP) may be used in some instances, which, for example, allows data packets to bypass routing queues.

In this unique system, transactions in switching system 123 are reported in near real time over computer telephony interface 212 to T-S 223, while transactions in switching system 124 are reported to T-S 224 over CIT interface 213. The telephony servers monitor all activity of the connected switching systems. Control routines in each T-S determine information relevancy and communicate information in near real time to statistical processor(s) 208. Given the language problem, for example, the pool of Spanish-speaking operators as distributed in real time over all calling centers may be tracked in processor 208, and updated as calls are completed and operators become available for new calls. Incoming calls may be routed to operator stations as operators become available in real time, avoiding queuing and long delays.

In FIG. 2 as an example, the pool of Spanish-speaking operators is represented by inclusion area 241, encompassing workstations 132 at call-in center 121 and workstation 134 at call-in center 122. Assume both operators are available, and a first call at SCP 101 is received requiring a Spanish-speaking operator, which is routed to call-in center 123 and telephone 138. The first call will last ten minutes (arbitrary for illustration). The use of the Spanish resource at call-in center 121 is immediately reported over CTI link 212 to T-S 223, and from T-S 223 to statistical processor 208 via TCP/IP link 210. Processor 208 then "knows" that the operator at workstation 132 is no longer available.

A second call is now received requesting a Spanish-speaking operator. The second call is routed to the remaining Spanish-speaking operator at workstation 134 at call-in center 122 (telephone 142), and the use of this resource is reported to T-S 224 via link 213, then by T-S 224 to statistical processor 208 via TCP/IP link 211. Assume for illustration this second call will last thirty seconds.

Now a third call is received requesting a Spanish-speaking operator. In the system of the preferred embodiment the third incoming call can be held at SCP 101 and routed to whichever operator becomes available first (telephone 142 at workstation 134 in less than thirty seconds). In the conventional system the call would be routed to call-in station 121 and to the operator at workstation 132 (telephone 138) based on load rather than availability, and the third caller would wait for most of ten minutes, while the operator at workstation 134 becomes available in less than thirty seconds.

In a preferred embodiment statistical processor 208 communicates with distribution processor 104 over link 214 in a manner that emulates conventional statistical routing, so no alteration in specific equipment is required to implement the invention in existing telephony equipment in most cases.

In another aspect of the present invention enhanced functionality is provided in routing and processing telephone calls between organized call-in centers established for servicing callers seeking services and the callers themselves. This enhanced functionality enables operators at such call-in centers to have immediate access to information derived from incoming calls and callers in initial processing.

In descriptions above, referring now to FIG. 1, an intelligent peripheral 102 was described, serving to provide initial processing of calls from persons seeking services from an organization providing such services from one or more call-in centers. In the above descriptions also, such callers were referred to as customers, following a continuing example utilizing an organizational structure having a technical service call-in operation for such as a computer equipment manufacturer.

Following the example of persons calling in to seek technical services in installing and/or configuring computer-related products, when such a caller first connects (FIG. 1, vector 107, SCP 101), initial processing will typically include eliciting information from the caller relative to such as caller preferences and relationship of the caller to the service provider's customer database. For example, the caller may have just purchased a model of one of the provider's products, meant to be installed in or connected to a particular make and model computer, and is experiencing difficulty in installing the product and making it function properly with the computer. In another instance such a caller may have had the provider's product for some time, and is only recently experiencing difficulty.

Most manufacturers provide a service whereby a customer may register a product, and in the process of registration a range of information from the customer is solicited, which will typically include the exact nature of the product in question, including model number, and also the characteristics of the computer (in this example) to which the customer has installed or is attempting to install the product.

In the latter instance above, the customer may already be registered, and if so, the fact of registration may allow the service provider to retrieve at some point considerable information from the provider's database relevant to the call. This information cannot be retrieved, however, until the fact of registration and some key to the customer's identity relative to the customer database is established. At the very least the originating phone number of the calling customer should be known, if not blocked, and this information may be enough to associate the caller with information in a database.

The example given here of a customer of a manufacturer of a computer product is but one of a very broad range of situations that may be encountered. Others include such as insurance companies, where persons calling in may be policy-holders; credit-card organizations, where callers may be seeking information such as current balance, available credit, and the like; and many others. In any case, a call-in customer may have certain preferences, such as language for the transaction, and there may be a need to identify the caller and his/her relationship to the organization providing the call-in service.

Most everyone is familiar with call-in services of the sort described herein, and there are likely few who look forward to having to use such a service. The reason is that long delays in establishing useful contact with an operator who has proper information available to help, are common.

An object of the present invention is to enhance call-in services, partially through more efficient initial processing, to the advantage of both the customer and the provider, by removing many of the causes of long delays.

Information is typically elicited in initial processing by interaction of the calling party with IP 102, which may be adapted to recite specific queries to the caller, and to record and forward the caller's responses. By recording is meant enrolling the nature of the responses in some form, not necessarily by voice recording. For example, a typical initial processing transaction involves a recorded query to the caller such as "Do you prefer Spanish or English". In some locales the query might be phrased in a language other than English. The caller is requested to respond typically by selecting a key on the touch-tone pad of his/her telephone. In many instances now as well, voice recognition is built into the initial processing machine intelligence, and the customer is instructed in verbal response, such as: "Say Yes or No". The IP in this case recognizes the response and codes data accordingly.

Information derived from a call or caller in such initial processing in conventional systems, as has been described herein above, is coded and attached, such as by DTMF or as caller-ID type information, to the call forwarded to the call-in center selected by use of information provided periodically to distribution processor 104. After initial processing is done and a call-in center is selected, the call is forwarded via lines 105/106 to call-in center 121/122 (FIG. 1). For purposes of simplicity in description, call-in center 121 will be assumed below to be the selected call-in center to which an example call is routed.

At call-in center 121 control code associated with switch 123 serves to decode at least some of the attached initial processing information, such as language preference, which is then used to further route the call to one or another telephone at an operator workstation, such as telephone 136 at operator workstation 131. The operator workstations (not necessarily the telephones) in the conventional operation, as was described above, are connected to a network having one or more servers which store the customer database for the organization providing the service. It is therefore only after the call is finally connected to the operator's workstation, after perhaps a frustrating delay, that any information attached to the call about the customer may be compared to the customer database, providing (hopefully) thereby further valuable information for the operator at the workstation to deal with the incoming call.

In an aspect of the invention described above with reference to FIG. 2, telephony servers are added to the call-in centers, each having a high-speed bus connection to associated switching equipment. In each case the telephony server is coupled to remote statistical processors at regional service control points, and connected to statistical processors 208 at remote call-in points.

Figure 3:
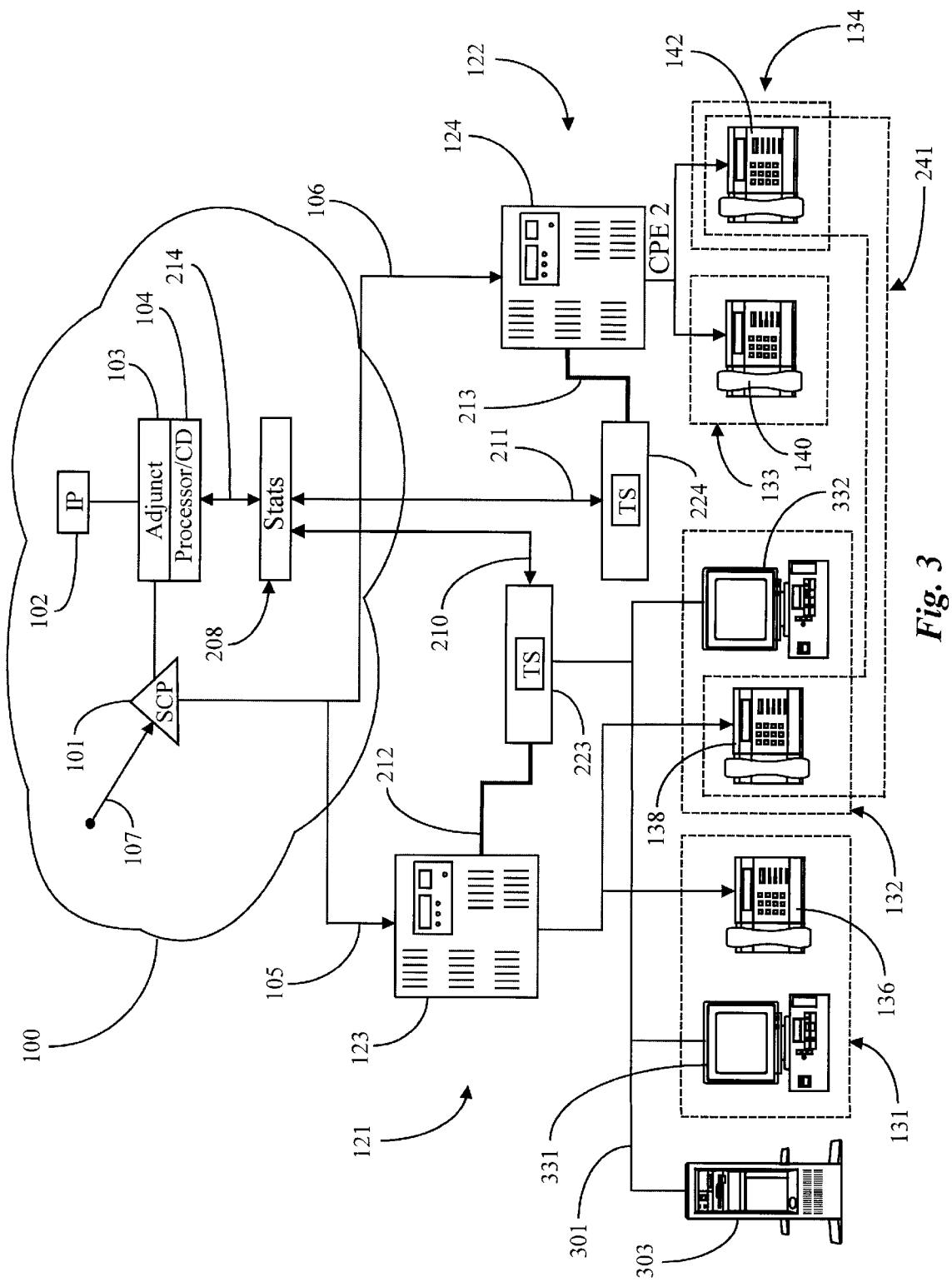
FIG. 3 is a diagram of a call and information routing system according to an alternative embodiment of the present invention.

FIG. 3 illustrates a further enhancement of the present invention. In this embodiment at each call-in center the service-provider has a network including a file server containing the service provider's customer database. In FIG. 3 such a network 301 is shown associated with call-in center 121. This or a similar arrangement may be assumed to be associated also with call-in center 122, and with other call-in centers not shown, although the repetitive details are not shown in the FIG. in order to avoid confusion.

Network 301 shown associated with call-in center 121 includes a server 303 having the service provider's customer database, and is coupled both to T-S223 and to workstations 131 and 132. In this system each workstation (131, 132) has a display terminal (VDU) connected to the network. VDU 331 is shown associated with workstation 131 and VDU 332 is associated with workstation 132. Such workstations typically include a keyboard and other input devices such as a pointer device.

In this embodiment as in embodiments described previously, when a call is received at SCP 101 (vector 107), initial processing is accomplished with the aid of IP 102, and information deemed possibly helpful to expedite the call and to route the call for most efficient service is elicited from the caller, as has been described above. Rather than attaching such information to the routed call, however, as was described above, the information is sent to a call-in center in parallel with the routed call (after the call is routed).

In this embodiment, after initial processing, elicited information is used to select one or more potential call-in centers for routing. For example, the caller may request a Spanish-speaking operator, and, through information available to statistical processor 208 the available pool of Spanish-speaking operators is known. Just as in the previous descriptions statistical processor 208 has up-to-the-minute information as to which Spanish-speaking operators are available.

In the previously described embodiment the information available to statistical processor 208 was used to route the call to a call-in center, and the information elicited in initial processing was attached to the call to be decoded and used at the call-in center. In the embodiment described with reference to FIG. 3 the information available to statistical processor 208 is used as before to select a call-in center (which, for descriptive purposes we will assume to be call-in center 121 in FIG. 3), and processor 208 then negotiates a semaphore with T-S 223 over communication link 210.

In this process statistical processor 208, having very recent data that a workstation at call-in center 121 is the best fit for the instant call, queries T-S 223, which continuously monitors transactions by switching equipment 123. If the best-fit station is available, T-S 223 passes back a token (semaphore) to forward the call. The token can be the phone number of the workstation to which the call is to be directed, or it can be a code that may be deciphered by some means at the caller's end to determine the number to which the call is to be directed.

When the token is passed from T-S 223 to statistical processor 208 for the instant call, two parallel communications are set in motion. One is that the call is routed on line 105 to switching circuitry 123 with information to further direct the call to the selected workstation. The other is that the initial processing information elicited from the caller, some of which may have been used in negotiating a destination for the call, is now forwarded to call-in center 121, not as added information on the phone call, but in parallel over link 210 directly from statistical processor 208 to T-S 223.

As T-S 223 is coupled to network 301, and as all of the workstations connected to network 301 have each a VDTJ in close proximity to a telephone connected to switching circuitry 123, whichever operator is at the workstation to which the call has been directed has immediate access to the initial processing information associated with the call. In a preferred embodiment the cross-matching of the caller with the database is done automatically, and pertinent information on the call is displayed at the receiving operator's workstation as or before the call is received.

In still another embodiment of the present invention agent-predictive routing is incorporated into machine-intelligence to expedite routing in a most cost-effective manner. Agent-predictive routing according to the present invention is based on knowledge of latency experienced in equipment while implementing certain operations, together with reasonable (but non-obvious) assumptions that may be made to expedite operations. It is in implementing the assumptions that the inventions lie in the instant aspects and embodiments of the invention.

Figure 4:
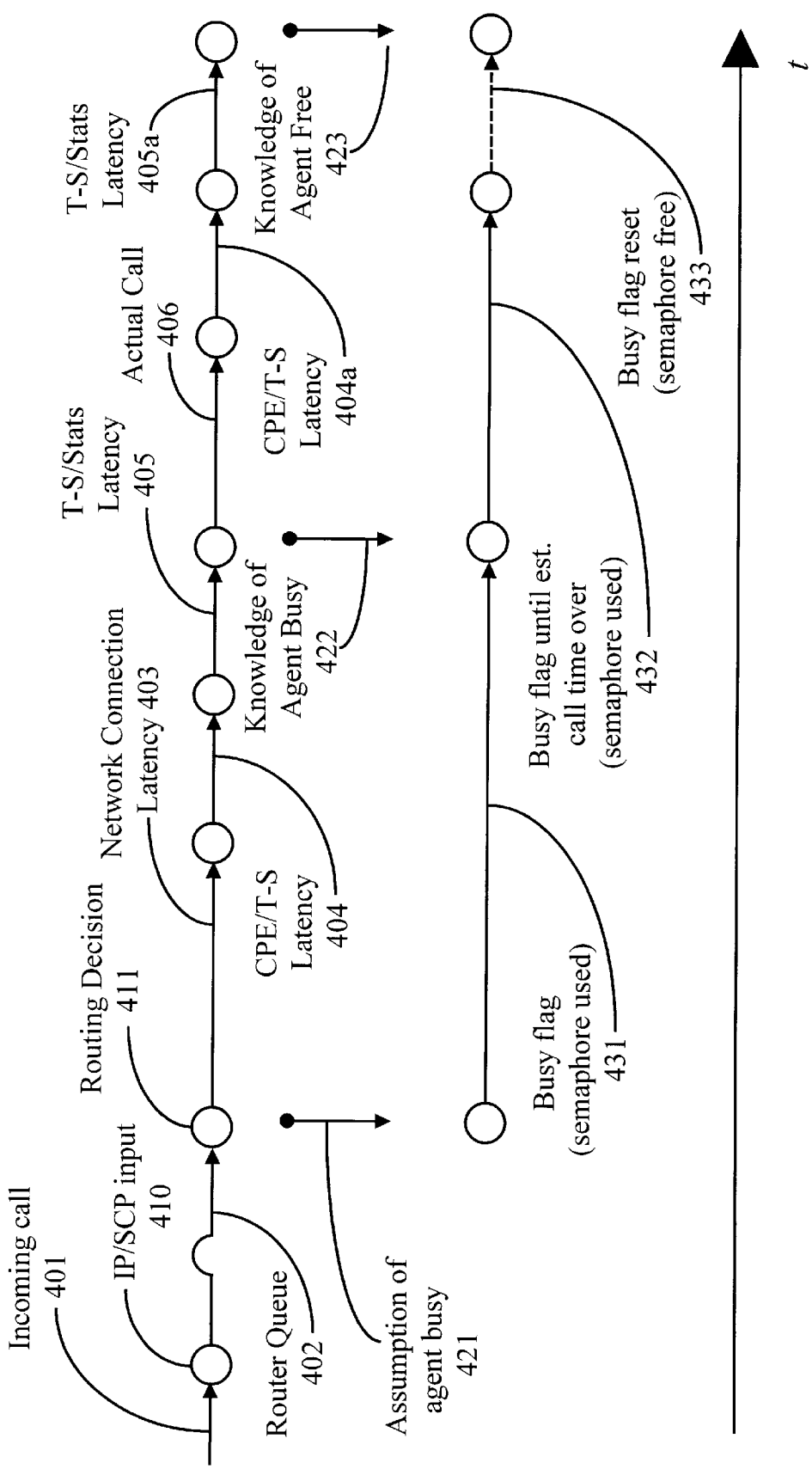
FIG. 4 is a timeline diagram showing latency in conventional operations and unique operational decisions according to an embodiment of the present invention.

FIG. 4 is a timeline diagram showing latency in operations without benefit of enhancements of the instant embodiment of the invention, and unique operational decisions according to the instant embodiment of the present invention. An upper time line beginning with arrow 401 represents latency for sequential events in routing and completing an actual call, given the parallel-path architecture represented by FIG. 3. The lower of the two timelines in FIG. 4 represents operations according to further embodiments of the present invention described below.

Arrow 401 in FIG. 4 represents an incoming call (vector 107, FIG. 3). At point 410 input information has been elicited from the caller (or otherwise determined), part of which is used in a process to determine routing. The time represented by arrow 402 termed "router queue" in FIG. 4 is the latency experienced for a typical call between the time point that initial processing is done and the routing decision is made at time point 411.

The next significant delay in routing is represented by arrow 403, labeled Network Connection Latency, which is the time required for a routed call to be received at, for example, telephony switch 123 (FIG. 3) at call-in center 121, to be further routed to an agent at one of the workstations, and for the agent to answer the call (pick up). Appended to this time in the course of events is time represented by arrow 404, which is the latency experienced in forwarding machine knowledge of the agent's having answered the call to telephony server T-S 223, for example. Further latency is experienced, represented by arrow 405, which is the time required for knowledge of the agent having picked up the call to be transferred back to the initial processing center.

At the end of the sequential time represented by arrow 405, machine knowledge of the agent busy is resident at statistical server 208 (FIG. 3), and is thus available to be used in routing decisions as described in embodiments above. This point in time is represented by down arrow 422. Following the time line beyond arrow 405, the time for the actual call is represented by arrow 406. During this time the agent and the caller are typically engaged in dialogue.

At the end of arrow 406, the call is completed and disconnected (both parties hang up). Machine knowledge of the termination of the call, however, is not instant. There is again latency in the termination knowledge transferring from switch 123 to T-S 223, and from T-S 223 to statistical server 208. These times are represented by arrows 404*a* and 405*a* respectively. At the end of the time represented by arrow 405*a* machine knowledge of the agent being free is resident at statistical processor 208 and is available for routing decisions.

In real-time terms, the Network Connection Latency (403) is typically about 10 seconds. The telephony switch to T-S latency (404) is typically about 4 to 5 seconds, and the T-S to stat. Server latency (405) is typically about 4 or 5 seconds as well. The total latency then, for routing a call to a call-in center and returning knowledge that the agent is busy is about 20 seconds.

At times of very heavy loading a system of the sort described may handle as many as one thousand calls per second. In the 20 seconds latency to return knowledge of a single call completed, then, there may be as many as twenty thousand new calls made to be routed. Clearly, especially at times of heavy load, the latency of 20 seconds or so can create serious problems in efficient routing. Unless there is some way to bypass this latency there may be as many as twenty thousand customers (callers) in waiting queues. What is clearly needed here is methods allowing prediction of behavior during the narrow time frame within the overall latency time.

In an embodiment of the present invention a reasonable assumption is made that after a call is transferred to an agent that is known to be free, that the agent is then busy. This is not always true, because a small percentage of calls may be mis-routed or somehow lost and never completed. The assumption, however, will be true most of the time.

Assumption of agent busy is represented in FIG. 4 by down arrow 421, at a point in time corresponding closely to routing decision 411. A busy flag (semaphore used) is posted in statistical processor 208 for this agent at that point in time, and the busy flag is maintained for the known full latency time (in this case about twenty seconds) until the actual return of agent busy knowledge. By this action routing of further calls to this agent during this latency time is avoided. Routing of further calls to this same destination, especially at times of relatively heavy loading, without this assumption and busy flag, would be very likely otherwise, and most such calls would be mis-routed and forced to start over.

In this embodiment of the invention, once knowledge of the agent busy is returned in real time (down arrow 422), in this embodiment of the invention the busy flag is reset to continue for a time determined by recent call history. This time is represented by arrow 432. The rationale for this action is that the actual call may be quite short, but the time for return in real time of machine knowledge that the agent is free is further delayed by switch to T-S latency (404*a*) and T-S to statistical processor latency (405*a*). By releasing the busy flag after an historically-determined average time for actual calls, more efficient use of the agents time may be made. Otherwise no further calls are ever routed to an agent until knowledge of agent free is returned in real time (423).

There are some difficulties that may occur in the embodiment here described. One of these is the instance wherein a call routed to an agent is lost before reaching the agent. This situation s represented in FIG. 5.

Figure 5:
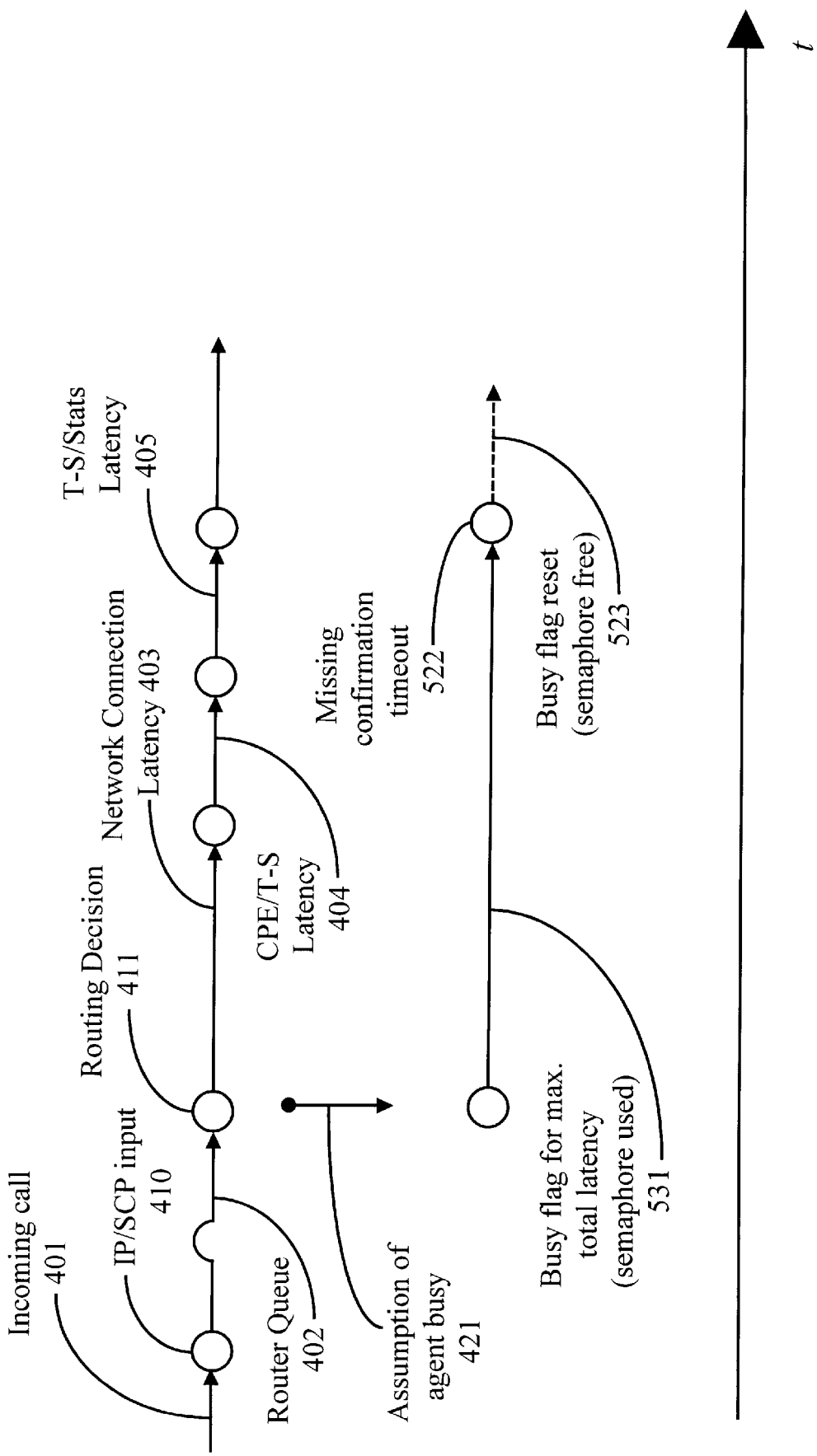
FIG. 5 is a timeline diagram showing further latency in conventional operations and unique operational decisions according to an alternative embodiment of the present invention.

In FIG. 5 part of the upper time line is the same as for FIG. 4, except the call is somehow lost, therefore there is no real-time return of agent busy as at down-arrow 422 in FIG. 4. In this case the assumption of agent busy is made at time 421 as before. At the end of the expected total latency time for real-time return of agent busy, however, there is no returned acknowledgment of agent busy. At this point (522) the busy semaphore is released, and the flag is set for agent free (arrow 523). The loss of an agent resource, then, is limited to about the latency time for real-time return of agent busy.

In another aspect of the invention latency is avoided by dynamic requeing of apparently mis-routed calls. Referring again to FIG. 5, at the point of missing confirmation of agent busy (522), in the embodiment described immediately above, the busy flag is reset for agent free. The assumption made in that prior embodiment was that the call was lost. The caller, for example, hung up or was somehow disconnected.

In an alternative preferred embodiment, at the point that latency time has expired and there is no return of agent busy, a different assumption is made. In this case the assumption is that the call was not lost, but simply mis-routed. This assumption that the call was mis-routed assumes the call is still active; that is, the caller is still on-line and expecting to make connection. In this embodiment, at the end of latency time for return of agent busy signal after a call has been routed (522), in the absence of return of the signal that the agent is busy, the call is cut off and requeued at the SCP, to be again routed to the best fit agent according to real-time data in statistical processor 208. This data will have been updated in the interval, but since the agent to whom the mis-routed call was originally routed has been assumed to be busy, but apparently is not, in a preferred embodiment the call is again routed to the same agent as initially routed.

In an embodiment of the present invention described above, an incoming call is routed to a remote telephone station by a routing intelligence negotiating a semaphore with an intelligence at the remote station. Referring to FIG. 3, this process is implemented by, for example, statistical server 208 negotiating over network link 210 with telephony server 223, which monitors activity of telephony switch 123. Statistical server 208 requests the status of a station having a skill profile fitting the needs of a call to be routed, and server 223, finding the station free (not busy) returns the semaphore, which will typically be the telephone number of the station. Once the semaphore is returned, the statistical server causes the call to be routed to the telephone station, and a data packet associated with the call is transmitted in parallel over the network link, synchronized by the semaphore.

The process of the prior embodiment as just described involves some latency in communication over the network link before the call may be routed. To avoid this latency, in an alternative preferred embodiment of the invention, the routing system determines a telephone station which fits the needs of an incoming call and which should be free (not busy) according to updated real-time information in the routing system. This information, as described previously, is updated in a continuing basis, suffering from only the latency of the network connection and the link between a telephony server (223) and a switch (123).

Once a station has been selected as fitting the profile and "should-be-free", the call is immediately routed. A semaphore is set in Statistical processor 208 that the telephone is then busy, and the associated data packet is sent over the network connection (210) with the telephone number associated, so the telephony server at the destination may apply the data to the correct call.

In yet another aspect of the invention allowance is made for agent-initiated requeing of mis-routed calls in intelligent call-routing systems of the sort described herein. In some cases, even with exercise of due caution, and perhaps even in some cases due to characteristics of routing in some embodiments of the invention, a small percentage of calls are mis-routed.

In case of a mis-routed call, the first indication does not come until the agent to whom the call is directed picks up. For example, a customer may, in initial processing, indicate a need for help in configuring a particular product. An error in initial processing, however, may result in routing the call to an agent trained for a different product or model. This will become apparent rather quickly when the agent answers the call and begins a dialogue with the customer.

The loss of time due to latency in connecting the call is not recoverable, but in aspects of the present invention further difficulty that might accrue is avoided. The least advantageous response at the agent's end is to simply inform the customer that the call must have been mis-routed, and to suggest that the caller (customer) hang up and place a new call, hoping for a better result. This response also portends the maximum incremental loading for the system, as all operations must then be redone. Still, without unique capabilities in the system, this response is the only one available to the agent.

In a preferred embodiment of the present invention control routines are provided at telephony server 223 allowing variable response for an agent receiving a mis-routed call. The control routines could reside elsewhere in the system, but the telephony server is a convenient repository. Three different paths are described immediately below for agent response to a mis-routed call. In every case the activity is in response to a signal initiated by the agent. The appropriate signal may be given in a variety of different ways, as will be apparent to those with skill in the art, such as a pattern of "clicks" at the handset switch, one or more inputs on the keypad of the agent's touch-tone phone, or a signal by pointer device or keyboard input at the agents workstation terminal, which is connected in a network to a telephony server such as T-S 223 (FIG. 3).

1. Giving a first agreed-to signal, the agent may return the call to SCP 101, which is, in fact a telephony switch. This signal causes communication via network connection 210 (in the case of T-S 223) back to statistical server 208, which instructs the call to be re-routed to an agent equipped to provide the needed service. The input by the agent corrects the routing according to information from the customer. In this case the call may be inserted in the queue at SCP 101 ahead of other calls placed after the instant call was first placed, to expedite the mis-routed call and avoid further delay for a perhaps already irate customer. This first option may be thought of as a file-and-forget option for the agent first receiving the mis-routed call.

2. In some cases the mis-routing may have occurred for a reason that will require the first agent receiving the call to communicate with another agent. For example, even though a careful job may be done in listing skills for various agents, the skills listed for a particular agent may not be exact, and a call may be routed to an agent who is not, in fact, equipped to provide the needed service. In this case, the agent first receiving the call may signal re-routing for the call, and be connected to the agent to which the call is forwarded before the customer is connected to that agent. This may happen in any of several ways. The call may be re-routed from switch 123 or sent back to SCP 101, for example. In any case, the rerouting is done via communication between T-S 223 with statistical server 208 (which controls routing) over digital network connection 210. The first agent is connected to the second agent with priority, rather than having to wait in a que like any other incoming call. The first agent may then determine that the second agent is indeed capable of providing the needed service, may also provide certain information to the second agent derived from first contact with the customer, and then the customer is keyed into the call with the second agent as the first agent leaves. This option is known as an announcement option, as the customer may be announced to the second agent without participation by the customer.

3. In a third option a conference may be needed between the first agent, the second agent, and the customer. This may be needed, for example, if the customer requests a conference with a supervisor, or if, for example, the skills of two different agents may be needed to properly serve the customer's need. In this case, through appropriate signaling, the agent first receiving the call may cause the call to be rerouted to another agent or supervisor at the same call-in center or at another call-in center. The operation is similar to the operation for case (2) described immediately above, except the customer is conferenced in from the beginning.

In descriptions above of other embodiments of the present invention a data set unique to each call is sent via the digital network connection between, for example, statistical processor 208 and T-S 223 as the call is routed in parallel over telephony line 105. The data set, along with other information derived from the organization's customer data base may be displayed on a display at the agent's workstation as an aid in providing needed service to the calling customer. In all of the instances of correcting mis-routed calls described immediately above, this data set is forwarded to the new agent with the call.

It will be apparent to those with skill in the art that there are many alterations that may be made in the embodiments of the invention herein described without departing from the spirit and scope of the invention. Most, and in some cases, all of the functional units of the system in embodiments of the invention may be implemented as code routines in more-or-less conventional computerized telephony equipment and computer servers. It is well-known that programmers are highly individualistic, and may implement similar functionality by considerably different routines. Also, the invention may be applied to widely varying hardware systems. Further, the links between servers 223 and 224 to the associated equipment may be done in a number of ways, and there is a broad variety of equipment that might be adapted to provide the servers 223 and 224, and other such servers associated with call centers. There are similarly many other alterations inn the embodiments described herein which will fall within the spirit and scope of the present invention in it's several aspects described. The invention is limited only by the breadth of the claims below.

What is claimed is:

1. A telephone call-routing system for re-routing a first incoming call, comprising:

a first network-level telephony switching apparatus having a first telephony trunk for receiving and switching the incoming call;

a first Computer Telephony Integration (CTI) processor coupled to the first telephony switching apparatus;

a client-premises call center having a second telephony switching apparatus connected to individual telephones at a plurality of agent stations and to the first telephony switching apparatus by a telephony trunk; and a second CTI processor connected to the second telephony switching apparatus by a CTI link, to the first CTI processor by a digital network link separate from the telephony trunk, and to computers at individual ones of the agent stations by a local area network (LAN);

wherein the first CTI processor controls queuing and routing of incoming calls, and responds to signals from a first agent received over the digital network link through the LAN and the second CTI processor to re-route the first incoming call previously routed to the first agent according to existing routing rules at the first CTI processor.

2. The call-routing system of claim 1 wherein the first CTI processor queues the re-routed first incoming call signaled by the first agent to be re-routed with priority ahead of a second incoming call received at the first telephony switching apparatus after the first incoming call.

3. The call-routing system of claim 1 wherein the first CTI processor in re-routing the first incoming call from the first agent to a second agent causes the first agent to be conferenced with the second agent before the re-routed call is connected to the second agent.

4. The call-routing system of claim 1 wherein the first CTI processor in re-routing the first incoming call from the first agent to a second agent causes the first agent, the second agent and the caller to be conferenced.

* * * * *